(12) United States Patent  
Knox et al.

(10) Patent No.: US 8,890,461 B2
(45) Date of Patent: Nov. 18, 2014

(54) ACTUATOR ASSEMBLY WITH PRELOADED BALL SCREWS

(75) Inventors: Lawrence D. Knox, Hopkinton, MA (US); Dariusz A. Bushko, Hopkinton, MA (US); Marco Giovanardi, Melrose, MA (US)

(73) Assignee: Bose Corporation, Framingham, MA (US)

( * ) Notice: Subject to any disclaimer, the term of this patent is extended or adjusted under 35 U.S.C. 154(b) by 211 days.

(21) Appl. No.: 13/427,382

(22) Filed: Mar. 22, 2012

(65) Prior Publication Data

US 2013/0249464 A1    Sep. 26, 2013

(51) Int. Cl.
*G05B 11/32* (2006.01)
*F16H 25/12* (2006.01)

(52) U.S. Cl.
USPC ............... 318/625; 280/5.515; 280/5.514; 280/6.157

(58) Field of Classification Search
USPC ............... 280/5.515, 5.514, 6.157, 6.159
See application file for complete search history.

(56) References Cited

U.S. PATENT DOCUMENTS

| | | | | |
|---|---|---|---|---|
| 5,704,250 | A * | 1/1998 | Black ........................ | 74/89.3 |
| 6,345,681 | B1 * | 2/2002 | Hackl et al. .................. | 180/402 |
| 7,896,803 | B2 * | 3/2011 | Schara et al. ................ | 600/173 |
| 7,963,529 | B2 | 6/2011 | Oteman et al. | |
| 2003/0196849 | A1 * | 10/2003 | Menjak et al. ................ | 180/446 |
| 2006/0088417 | A1 * | 4/2006 | Louis et al. .................. | 416/142 |
| 2011/0136609 | A1 * | 6/2011 | Knoblauch ................... | 475/150 |
| 2013/0221625 | A1 | 8/2013 | Pare | |
| 2013/0229074 | A1 * | 9/2013 | Haferman et al. ............. | 310/83 |

FOREIGN PATENT DOCUMENTS

| | | |
|---|---|---|
| CA | 2 529 534 A1 | 6/2007 |
| DE | 197 54 258 A1 | 6/1999 |
| DE | 101 14 600 A1 | 1/2002 |
| EP | 2 077 198 A1 | 7/2009 |
| EP | 2 334 947 B1 | 2/2012 |
| JP | 2005 106106 A | 4/2005 |
| WO | WO 2010027701 A1 * | 3/2010 |

OTHER PUBLICATIONS

International Search Report and Written Opinion of the International Searching Authority mailed on Jul. 4, 2013 for corresponding PCT Application No. PCT/US2013/033272.
Overview of Leadscrew Assemblies; HaydonKerk Motion Solutions of Waterbury, Connecticut, Leadscrew Technology, pp. 1-7; i Catalog, pp. 4-10; downloadable at http://www.haydonkerk.com/LinearActuatorProducts/LeadScrewsAndNuts/KerkoteBlackiceTFELubricants/tabid/258/Default.aspx, Jan. 2011.

* cited by examiner

*Primary Examiner* — Eduardo Colon Santana
*Assistant Examiner* — Said Bouziane
(74) *Attorney, Agent, or Firm* — Brian M. Dingman; Dingman, McInnes + McLane, LLP (57) ABSTRACT

An actuator assembly includes a first motor having a first transmission mechanism, a second motor having a second transmission mechanism, and a drive shaft operatively coupled to the first transmission mechanism of the first motor and the second transmission mechanism of the second motor. The actuator assembly includes a torque application system disposed in operative communication with the first motor and the second motor, the torque application system configured to direct an application of a translation torque and a preload torque between the first motor and the first transmission mechanism and between the second motor and the second transmission mechanism.

12 Claims, 4 Drawing Sheets

ACTUATOR ASSEMBLY WITH PRELOADED BALL SCREWS

BACKGROUND

Conventional vehicle suspensions employ a spring and shock absorber to isolate wheel motion from body motion. Advances have been made in suspensions by making the suspensions active. For example, in an active suspension system, a controlled force is introduced between the mass of a vehicle body (i.e., a sprung mass) and the mass of a wheel assembly (i.e., an unsprung mass) to achieve improved comfort and handling.

An active suspension system can include an actuator system having a rotary motor disposed on a drive shaft and a transmission mechanism associated with the rotary motor. The transmission mechanism of each rotary motor is typically configured as a ball nut that engages a corresponding threaded portion of the drive shaft. During operation, the transmission mechanism converts the rotation of the rotary motor to a linear motion of the drive shaft along a single direction to adjust a position of the wheel assembly relative to the vehicle body.

In a conventional actuator system, the ball nut of each rotary motor can act as a bearing between the corresponding rotary motor and the drive shaft. For example, each ball nut includes a set of balls carried within a corresponding ball nut channel. The set of balls also engage a threaded portion disposed about an outer periphery of the drive shaft. To minimize binding of the set of balls during operation, the transmission mechanism is configured to allow some movement or play between each of the balls and the ball chamber defined by the ball nut channel and the threaded portion of the drive shaft. However, in the case where the drive shaft and the transmission mechanism change relative translation directions during operation, such as when transitioning from a contracted position to an extended position relative to the vehicle body, the direction of the translational force applied on the drive shaft changes. The change in force can unload one or more of the balls and expose the ball to a zero load crossing condition. As a result, the balls can then float or transition between the ball nut channel and the corresponding thread of the output shaft which generates both force and noise anomalies within the ball nut.

SUMMARY

In general, one aspect of the disclosure features an actuator assembly. The actuator assembly includes a first motor having a first transmission mechanism, a second motor having a second transmission mechanism, a drive shaft operatively coupled to the first transmission mechanism and the second transmission mechanism, and a torque application system disposed in operative communication with the first motor and the second motor. The torque application system is configured to direct an application of a translation torque and a preload torque between the first transmission mechanism and the drive shaft and between the second transmission mechanism and the drive shaft. The torque application system is configured to direct an application of a first component of the translation torque between the first transmission mechanism and the drive shaft to cause translation of the drive shaft in a first translation direction and is configured to direct an application of a second component of the translation torque between the second transmission mechanism and the drive shaft to cause translation of the drive shaft in the first translation direction. The torque application system is configured to direct an application of a first component of the preload torque between the first transmission mechanism and the drive shaft to generate a first translation force directed along the first translation direction and is configured to direct an application of a second component of the preload torque between the second transmission mechanism and the drive shaft to generate a second translation force directed along a second translation direction, the second translation direction opposite the first translation direction. The first transmission mechanism can include a first ball nut configured to engage a threaded portion of the drive shaft and the second transmission mechanism can include a second ball nut configured to engage the threaded portion of the drive shaft.

Various additional implementations may include one or more of the following features. The torque application system can include a controller disposed in electrical communication with the first motor and with the second motor. The controller is configured to generate a first drive signal as a sum of a translation torque control signal and a preload torque control signal, generate a second drive signal as a difference between the translation torque control signal and the preload torque control signal, the second drive signal distinct from the first drive signal, transmit the first drive signal to the first motor to generate the first component of the translation torque and the first component of the preload torque between the first transmission mechanism and the drive shaft, and transmit the second drive signal to the second motor to generate the second component of the translation torque and the second component of the preload torque between the second transmission mechanism and the drive shaft. The first motor and the second motor can be operable to adjust a linear position of the drive shaft along a longitudinal axis of the actuator assembly.

The controller can be configured to receive a driven force signal from a sensor associated with the drive shaft, the driven force signal indicating a force generated by the drive shaft, compare the driven force signal to a command force signal, and continue to transmit the first drive signal to the first motor and the second drive signal to the second motor until the driven force signal reaches the command force signal. The controller can be configured to compare a command force signal to a command force signal threshold. When command force signal is less than the command force signal threshold, the controller can generate the first drive signal as the sum of the translation torque control signal and the preload torque control signal, generate the second drive signal as the difference between the translation torque control signal and the preload torque control signal, transmit the first drive signal to the first motor to generate the first component of the translation torque and the first component of the preload torque between the first transmission mechanism and the drive shaft, and transmit the second component of the translation torque and the second component of the preload torque between the second transmission mechanism and the drive shaft. When the command force signal is greater than the command force signal threshold, the controller can transmit the translation torque control signal as the first drive signal to the first motor to generate the first component of the translation torque between the first transmission mechanism and the drive shaft and transmit the translation torque control signal as the second drive signal to the second motor to generate the second component of the translation torque between the second transmission mechanism and the drive shaft. When the command force signal is greater than the command force signal threshold, the controller can scale a magnitude of the preload torque control signal from a first preload signal level to a second preload signal level, the second preload signal level being less than the first preload signal level.

The controller can be configured to compare a rattle condition input with a rattle condition threshold. When the rattle condition input one of meets or exceeds the rattle condition threshold, the controller can generate the first drive signal as the sum of the translation torque control signal and the preload torque control signal and transmit the first drive signal to the first motor to generate the first component of the translation torque and the first component of the preload torque between the first transmission mechanism and the drive shaft. The controller can generate the second drive signal as the difference between the translation torque control signal and the preload torque control signal and transmit the second drive signal to the second motor to generate the second component of the translation torque and the second component of the preload torque between the second transmission mechanism and the drive shaft.

When the rattle condition input does not meet the rattle condition threshold, the controller can transmit the translation torque control signal as the first drive signal to the first motor to generate the first component of the translation torque between the first transmission mechanism and the drive shaft and transmit the translation torque control signal as the second drive signal to the second motor to generate the second component of the translation torque between the second transmission mechanism and the drive shaft. When the rattle condition input does not meet the rattle condition threshold, the controller can scale a magnitude of the preload torque control signal from a first preload signal level to a second preload signal level, the second preload signal level being less than the first preload signal level.

The first component of the translation torque between the first transmission mechanism and the drive shaft and the second component of the translation torque between the second transmission mechanism and the drive shaft can be configured as counter-rotating torques. The first component of the preload torque between the first transmission mechanism and the drive shaft and the second component of the preload torque between the second transmission mechanism and the drive shaft can be configured as co-rotating torques.

In general, another aspect of the disclosure features an actuator assembly that includes a first motor having a first transmission mechanism, a second motor having a second transmission mechanism, a drive shaft operatively coupled to the first transmission mechanism and the second transmission mechanism, and a controller disposed in electrical communication with the first motor and with the second motor. The controller is configured to generate a first drive signal as a sum of a translation torque control signal and a preload torque control signal, generate a second drive signal as a difference between the translation torque control signal and the preload torque control signal, the second drive signal distinct from the first drive signal, transmit the first drive signal to the first motor to generate a first component of a translation torque between the first transmission mechanism and the drive shaft to cause translation of the drive shaft in a first translation direction and to generate a first component of a preload torque to direct a first translation force along the first translation direction, and transmit the second drive signal to the second motor to generate a second component of the translation torque between the second transmission mechanism and the drive shaft to cause translation of the drive shaft in the first translation direction and to generate a second component of the preload torque to direct a second translation force along a second translation direction, the second translation direction opposite the first translation direction. The first transmission mechanism can include a first ball nut configured to engage a threaded portion of the drive shaft and the second transmission mechanism can include a second ball nut configured to engage the threaded portion of the drive shaft In general, another aspect of the disclosure features a method for operating an actuator assembly by a torque application system. The method includes generating, by the torque application system, a first drive signal as a sum of a translation torque control signal and a preload torque control signal, generating, by the torque application system, a second drive signal as a difference between the translation torque control signal and the preload torque control signal, the second drive signal distinct from the first drive signal, transmitting, by the torque application system, the first drive signal to a first motor of the actuator assembly to generate a first component of a translation torque and a first component of a preload torque between a first transmission mechanism and a drive shaft of the actuator assembly, the first component of the translation torque operable to cause translation of the drive shaft in a first translation direction and the first component of the preload torque configured to generate a first translation force directed along the first translation direction, and transmitting, by the torque application system, the second drive signal to the second motor to generate a second component of the translation torque and a second component of the preload torque between a second transmission mechanism and the drive shaft, the second component of the translation torque operable to cause translation of the drive shaft in the first translation direction and the second component of the preload torque operable to generate a second translation force directed along a second translation direction, the second translation direction opposite the first translation direction. The first transmission mechanism can include a first ball nut configured to engage a threaded portion of the drive shaft and the second transmission mechanism comprises a second ball nut configured to engage the threaded portion of the drive shaft.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the innovation of this application relate to an actuator assembly having preloaded ball screws. In one arrangement, the actuator assembly includes a pair of motors, each having a corresponding transmission mechanism such as a ball screw. The actuator assembly also includes torque application system configured to superimpose a preload torque onto a translation torque applied between the transmission mechanisms and a corresponding drive shaft. For example, in the case where the actuator assembly is configured as a counter rotating actuator, the translation torque creates torques between the transmission mechanisms and the drive shaft in the same rotational direction. In such a case, the torque application system causes the actuator to generate counter rotating preload torques between the transmission mechanisms and the drive shaft by reversing the torque command to one of the two motors. The counter rotating preload torques, in turn, create translational forces in opposing directions relative to the drive shaft, which then cancel. Thus, the preload torques do not generate a translational force on the drive shaft, but do bias the balls of the ball screw between the ball nut channel and the threaded portion of the drive shaft to minimize or prevent zero force conditions on the balls as the drive shaft changes translation direction during operation.

Figure 1:
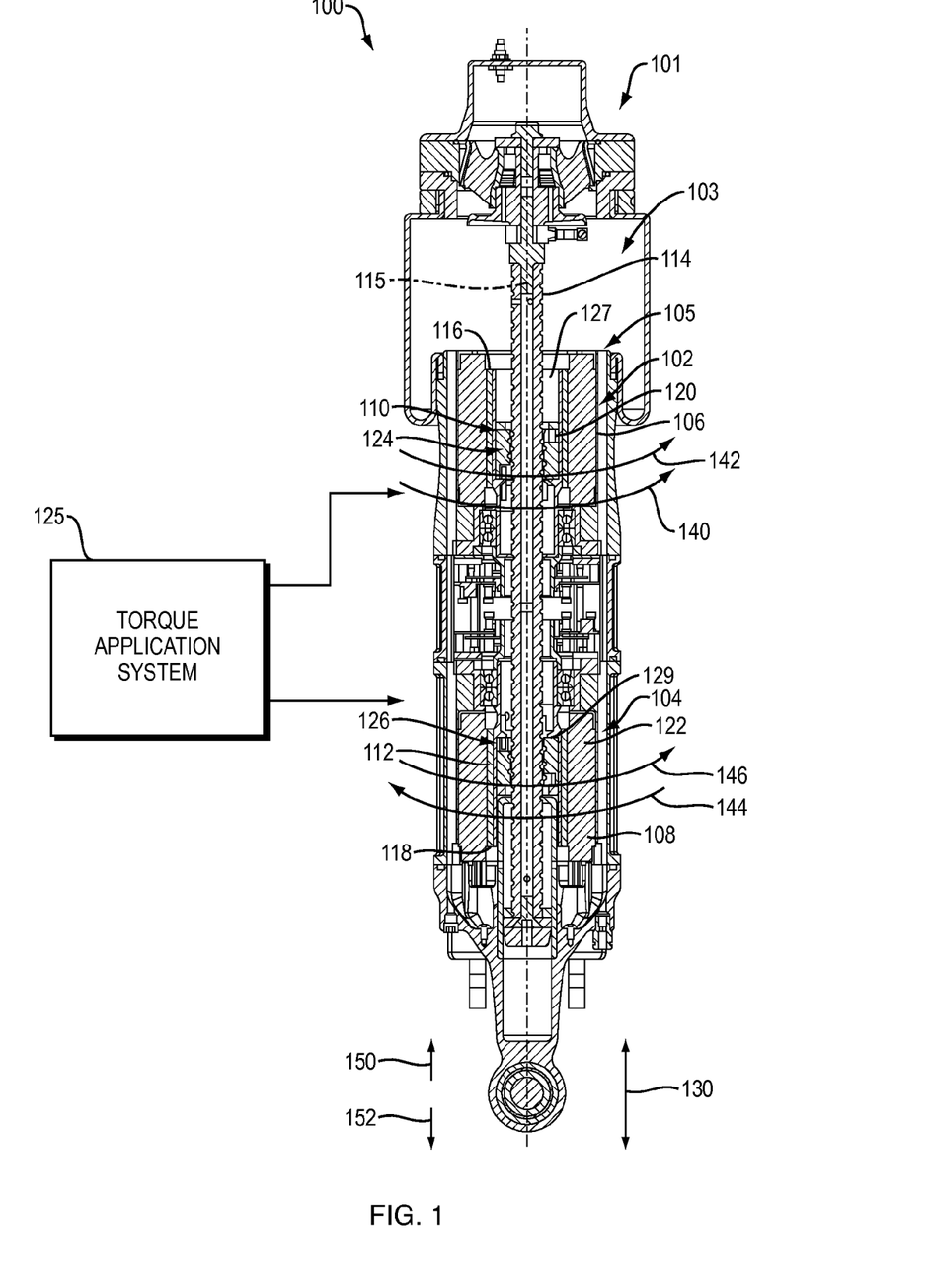
FIG. 1 illustrates a sectional view of a schematic representation of an actuator assembly having a torque application system.

FIG. 1 illustrates a sectional view of a schematic depiction of the actuator assembly 100, according to one arrangement. The actuator assembly 100 includes an actuator 101 having a drive assembly 103 and a torque application system 125 disposed in electrical communication with the drive assembly 103. As indicated in FIG. 1, the drive assembly 103 includes a set of motors 105 and a drive shaft 114 disposed in operational communication with the set of motors 105.

In one arrangement, the set of motors 105 includes a first motor 102 and a second motor 104 disposed along the drive shaft 114 and which are operable to adjust a linear position of the drive shaft 114 along a longitudinal axis 115. Each motor 102, 104 includes a stator 106, 108, which can include back iron or other ferromagnetic material and coils, and a rotor assembly 110, 112. Furthermore, each rotor assembly 110, 112 includes a spindle 116, 118 having a transmission mechanism 124, 126 and a set of magnets 120, 122 disposed about an outer periphery of the spindle 116, 118. While the transmission mechanisms 124, 126 can be configured in a variety of ways, in one arrangement each transmission mechanism 124, 126 is configured as a ball screw or ball nut 127, 129. For example, the ball nuts 127, 129 include a set of balls (not shown) carried within a ball nut channel (not shown). The balls engage a threaded portion disposed about an outer periphery of the drive shaft 114.

An interface between the ball nuts 127, 129 and the drive shaft 114 can be configured in a variety of ways. In one arrangement, the first ball nut 127 can interface with a section of drive shaft 114 having oppositely cut threads relative to a section of the drive shaft 114 that the second ball nut 129 interfaces with. For example, the first ball nut 127 includes a ball nut channel and set of balls configured to mate with a right-handed threaded portion of the drive shaft 114 while the second ball nut 129 includes a ball nut channel and set of balls configured to mate with a left-handed thread of the drive shaft 114. In such an arrangement, each of the ball nuts 127, 129 is configured as mirror opposite to the other.

In one arrangement, the actuator 101 is configured as a counter rotating actuator such that the motor spindles 116, 118 rotate in different (i.e., opposing) directions in order to drive the drive shaft 114 in a linear direction 130. For example, each spindle 116, 118 and transmission mechanism 124, 126, such as ball nuts 127, 129, is configured to rotate around the common, longitudinal axis 115 of the actuator 101 in opposing directions to linearly position and the drive shaft 114 along the longitudinal axis 115 and to constrain the drive shaft 114 to linear translation along the longitudinal axis 115.

In one arrangement, during operation, an electrical current source, such as the torque application system 125, passes current through coils in the stators 106, 108 to generate a rotating magnetic field relative to the respective magnets 120, 122 of the corresponding rotor assemblies 110, 112. Each magnetic field, in turn, generates a force between the magnets 120, 122 of each rotor assembly 110, 112 and the respective stators 106, 108. In response to the forces and by nature of the geometry of the ball nuts 127, 129 relative to the threads of the drive shaft 114, the spindles 116, 118 rotate in opposite directions about a longitudinal axis 115 of the actuator 101. Interaction between each of the ball nuts 127, 129 and the drive shaft 114, operates to adjust the relative linear position of the ball nuts 127, 129 and the drive shaft 114 along longitudinal axis 115. Hence, the two motor spindles 116, 118 generate opposing torques on the drive shaft 114 and together create forces along a common translational direction 130.

In one arrangement, the torque application system 125 is disposed in operable communication with the drive assembly 103. While the torque application system 125 is illustrated as being disposed as a separate component, external to the actuator 101, such illustration is by way of example only. The torque application system 125 can be integrally formed as part of the actuator 101.

The torque application system 125 is configured to direct an application of a translation torque and a preload torque between the first transmission mechanism 124 and the drive shaft 114 and between the second transmission mechanism 126 and the drive shaft 114. The translation torque is operable to adjust the linear motion 130 of the drive shaft 114 relative to the longitudinal axis 115 while the preload torque is configured to maintain a load on the set of balls of each of the ball nuts 127, 129 relative to the drive shaft 114 as the drive shaft 114 and the ball nuts 127, 129 translate relative to each other.

As indicated above, in the absence of a preload and in the case where the direction of the translational force applied on the drive shaft changes, the balls of the ball nut can transition through a zero force condition and can generate both force and noise anomalies within the ball nut. By causing the ball nuts 127, 129 to apply a preload torque on the drive shaft 114, the torque application system 125 can minimize or limit the frequency and/or severity of backlash transitions on the ball nuts 127, 129.

In response to direction from the torque application system 125, the drive assembly 103 can apply the translation torque and the preload torque between the transmission mechanisms 124, 126 and the drive shaft 114 in a variety of ways. For example, the torque application system 125 can direct the drive assembly 103 to apply a first component of the translation torque 140 between the first transmission mechanism 124, such as the ball nut 127, and the drive shaft 114. The torque application system 125 can also direct the drive assembly 103 to apply a second component of the translation torque 144 between the second transmission mechanism 126, such as ball nut 129, and the drive shaft 114.

As indicated above, based upon the geometric configuration of the ball nuts 127, 129 and the threaded portions of the drive shaft 114, the first and second components of the translation torque 140, 144 are configured as counter-rotating torques that adjust the relative, linear positioning of the set of motors 105 and the drive shaft 114 along direction 150. For example, the translation torque 140 generates an axial force on the drive shaft 114, such as along direction 150, and causes translation of the drive shaft 114 in that direction 150. The translation torque 144 also generates an axial force on the drive shaft 114, such as along direction 150, and causes translation of the drive shaft 114 in that direction 150. Accordingly, the two motors 102, 104 with opposing translation torques 140, 144 both create forces in the same translational direction 150.

Additionally, the torque application system 125 can direct the drive assembly 103 to apply a first component of the preload torque 142 between the first transmission mechanism 124, such as the ball nut 127, and the drive shaft 114 to generate a first translation force directed along the first translation direction 150. The torque application system 125 can also direct the drive assembly 103 to apply a second component of the preload torque 146 between the second transmission mechanism 126, such as ball nut 129, and the drive shaft 114 to generate a second translation force directed along a second translation direction 152, the second translation direction opposite the first translation direction.

As indicated in FIG. 1, the first and second components of the preload torque 142, 146 are configured as co-rotating torques that load the set of balls between the ball nut channel and the threaded portion of the drive shaft 114. Based upon the geometric configuration of the ball nuts 127, 129 and the threaded portions of the drive shaft 114 (i.e., the ball nuts 127, 129 configured as mirrored opposites to each other), the first and second components of the preload torque 142, 146 generate equal but opposite translational forces on the drive shaft 114, which cancel each other. Accordingly, application of the preload torques 142, 146 results in no net translational force on the drive shaft 114 and instead biases or loads the ball nuts 127, 129 and corresponding sets of balls relative to the drive shaft 114.

During operation, the drive assembly 103 effectively superimposes the first and second components of the preload torque 142, 146 over the respective first and second components of the translation torque 140, 144. The preload torque 142, 146 maintains a load on the set of balls of the ball nuts 127, 129 during operation and minimizes instances of zero force crossings (i.e., instances where there is zero load on the set of balls) as the direction of the translational force applied on the drive shaft 114 changes.

For example, assume the motors 102, 104 position the drive shaft 114 along a first linear direction 150. Further assume that, during operation, the motors 102, 104 change the direction of the positioning of the drive shaft 114 such that the motors 102, 104 position the drive shaft 114 along a second linear direction 152. In such a case, as the motors 102, 104 transition the drive shaft 114 from the first direction 150 to the second direction 152, the direction of the translational force applied on the drive shaft 114 by the motors 102, 104 changes. The preload torque 142 between the first ball nut 127 and the drive shaft 114 and the preload torque 142 between the second ball nut 129 and the drive shaft 114 maintains an offset load on the ball nuts 127, 129 relative to the threaded portion of the drive shaft 114. Accordingly, as the direction of the translational force applied on the drive shaft 114 by the motors 102, 104 changes, the offset load minimizes exposing the ball to a zero load crossing condition. This minimizes looseness or rattling of the balls relative to the ball nut channel and drive shaft 115 which can, in turn, minimize noise generated by the actuator assembly 100 during operation.

The torque application system 125 can direct the application of a translation torque and a preload torque between the first transmission mechanism 124 and the drive shaft 114 and between the second transmission mechanism 126 and the drive shaft 114 in a variety of ways. For example, as will be described below, the torque application system 125 is disposed in electrical communication with the motors 102, 104 and can provide signals or current to the corresponding stators 106, 108 to cause the associated transmission mechanisms 124, 126 to apply the translation torque and the preload torque relative to the drive shaft 114.

Figure 2:
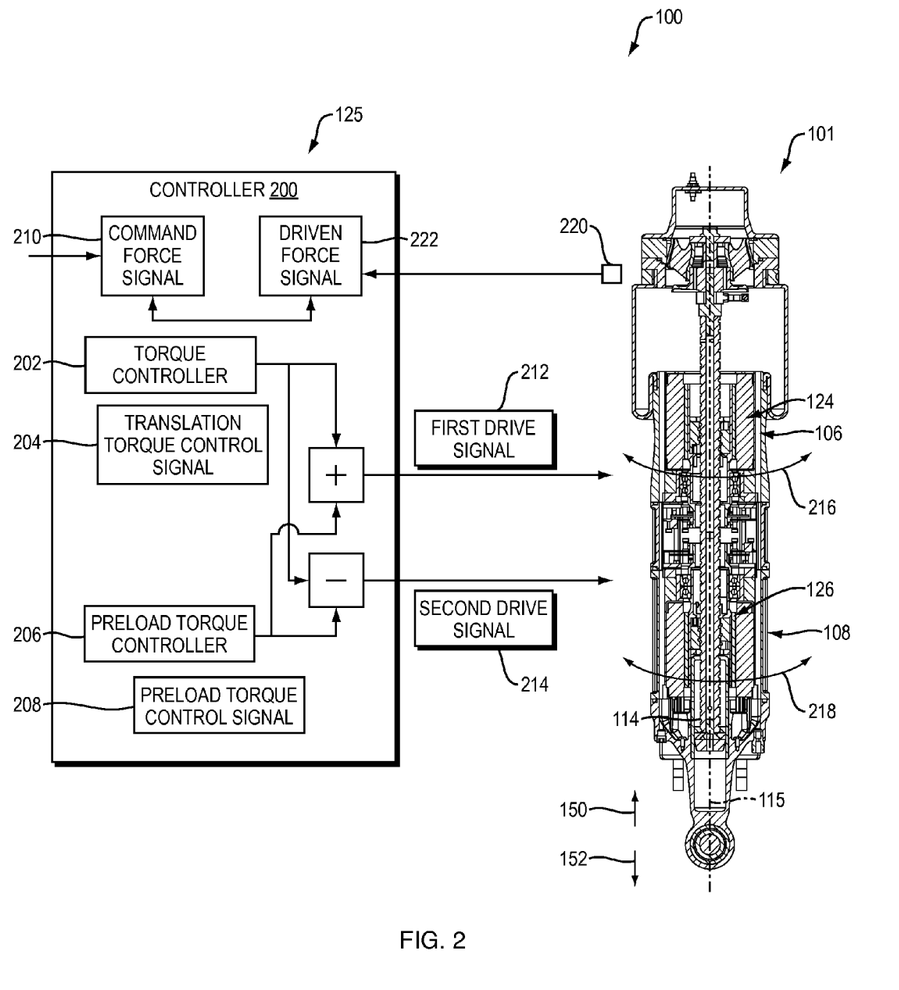
FIG. 2 illustrates the actuator assembly of FIG. 1 and a schematic representation of a controller of the torque application system of FIG. 1.

FIG. 2 illustrates an arrangement of the torque application system 125 having a controller 200, such as a processor and a memory, disposed in electrical communication with the motors 106, 108 of the actuator 101. The controller 200 includes a torque controller 202 configured to generate a translation torque control signal 204 and a preload torque controller 206 configured to generate a preload torque control signal 208. The translation torque control signal 204 is configured to operate the motors 102, 104 to generate an axial load on the drive shaft 114. The preload torque control signal 208 configured as an offset command to offset the translation torque control signal 204 relative to zero and to operate the motors 102, 104 to generate a bias force between the ball nuts 127, 129 and the drive shaft 114.

During operation, the controller 200 receives a command force signal 210 that directs the controller to operate the actuator 101 to position the drive shaft 114 until the drive shaft 114 generates a particular (i.e., commanded) load or force associated with the signal. In response to receiving the command force signal 210, the torque controller 202 generates the translation torque control signal 204 and the preload torque controller 206 generates the preload torque control signal 208. The translation torque control signal 204 can be proportional to the received command force signal 210 while the preload torque control signal 208 can be preconfigured as having a substantially constant value. The controller 200 then generates a first drive signal 212 as a sum of the translation torque control signal 204 and the preload torque control signal 208 and generates a second drive signal 214 as a difference between the translation torque control signal 204 and the preload torque control signal 208. The controller 200 then transmits the first drive signal 212 to the first motor 106 to generate a torque 216, which includes the first component of the translation torque and the first component of the preload torque, between the first transmission mechanism 124 and the drive shaft 114. The controller also transmits the second drive signal 214 to the second motor 108 to generate a torque 218, which includes the second component of the translation torque and the second component of the preload torque, between the second transmission mechanism 126 and the drive shaft 114.

As a result of torques 216, 218, the drive shaft 114 translates along longitudinal axis 115 and generates an axial load or force between a vehicle body and a wheel assembly. In one arrangement, the drive shaft 114 includes a sensor 220, such as a load cell, that generates a driven force signal 222 corresponding to the axial load generated by the drive shaft 114. The controller 200 is configured to utilize the driven force signal 222 to control operation of the torque controller 202 and the preload torque controller 208. For example, the controller 202 receives the driven force signal 222 from the sensor 220 as part of a feedback loop and compares the driven force signal 222 to the command force signal 210. As a result of the comparison, the controller 200 continues to transmit the first drive signal 212 to the first motor 106 and the second drive signal 214 to the second motor 108 and to receive driven force signal 222 until the driven force signal 222 reaches or equals the command force signal 210. Once the axial force generated by the drive shaft 114 reaches the commanded force level, the controller 200 can deactivate the torque controller 202 and the preload torque controller 206.

Because the preload torque control signal 208 is substantially constant, as a result of the controller 200 applying the preload torque control signal 208 to the translation torque control signal 204, the resulting first and second drive signals 212, 214 are not equal. The difference or offset between the signals 212 and 214 creates a bias force or preload between the first and second transmission mechanisms 124, 126 and the drive shaft 114 as the drive shaft 114 translates along and between first and second directions 150, 152. The preload, in turn, minimizes the occurrence of a zero force condition on the transmission mechanisms 124, 126 as well as the frequency and or severity of backlash transitions between the transmission mechanisms 124, 126 and the drive shaft 114.

As indicated above, the controller 200 can be configured to introduce a static offset preload torque control signal 208 to the translation torque control signal 204 to keep the operating force associated with the drive shaft 114 away from zero net force to avoid many zero crossings. In one arrangement, the controller 200 is configured to dynamically apply the preload torque control signal 208 to the translation torque control signal 204 in response to particular conditions associated with the actuator assembly.

Figure 3:
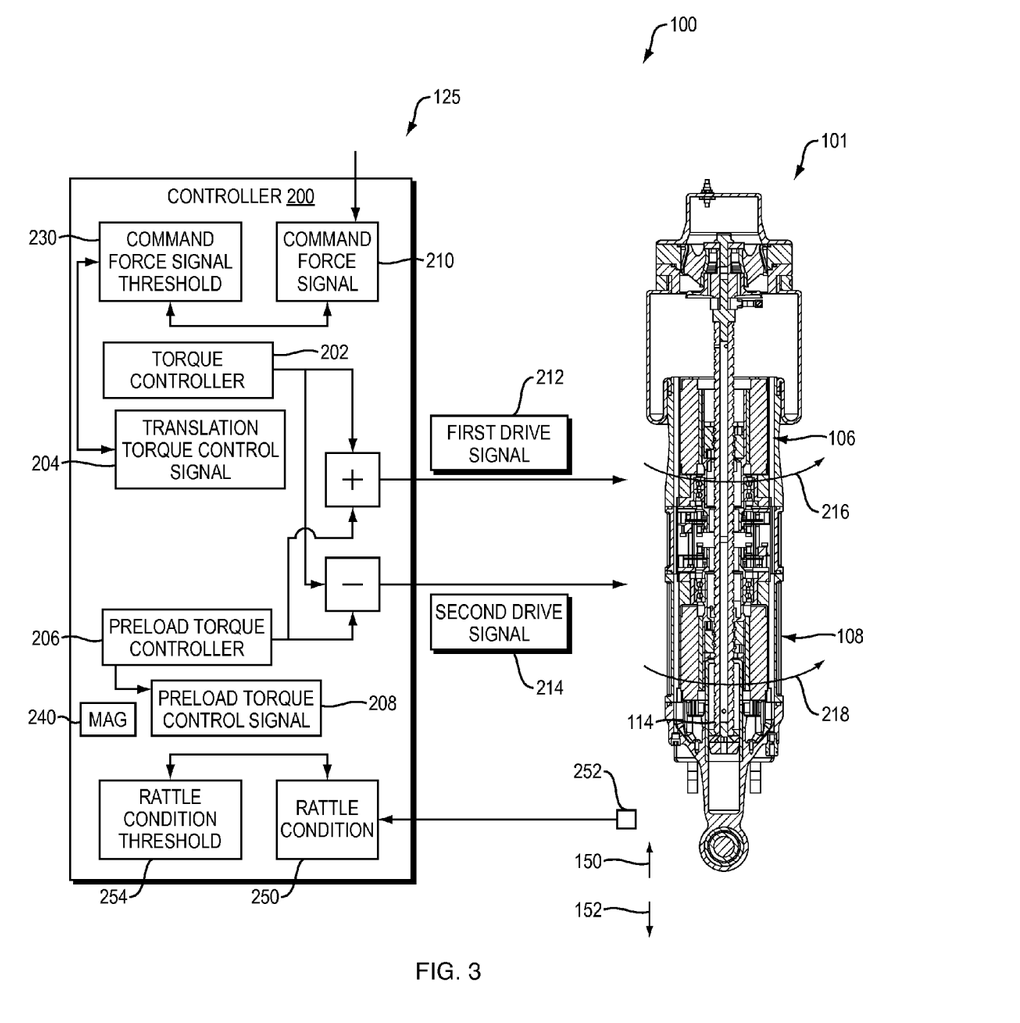
FIG. 3 illustrates a schematic representation of the controller of FIG. 2 applying combinations of a translation torque control signal and a preload torque control signal to generate a first drive signal and a second drive signal.

For example, with reference to FIG. 3, the controller 200 can be configured to combine the offset preload torque control signal 208 with the translation torque control signal 204 to generate the first and second drive signals 212, 214 when the command forces associated with the command force signal 210 are relatively small. As indicated in FIG. 3, when the controller 200 receives the command force signal 210, the controller 200 compares the command force signal 210 with a command force signal threshold 230. In one arrangement, the command force signal threshold 230 is configured as being equal to a value associated with a preset preload torque control signal 208.

Assume the case where the controller 200 detects the command force signal 210 as being smaller than the command force signal threshold 230. If the controller 200 were to output the translation torque control signal 204 as the first and second drive signals 202, 204, operation of the motors 106, 108 can expose the transmission mechanisms 124, 126 to zero force conditions. Instead, the controller 200 generates the first drive signal 212 as the sum of the translation torque control signal 204 and the preload torque control signal 208 and generates the second drive signal 214 as the difference between the translation torque control signal 204 and the preload torque control signal 208. The controller 200 then transmits the first drive signal 212 to the first motor 106 to generate the torque 216, which includes the first component of the translation torque and the first component of the preload torque, between the first transmission mechanism 124 and the drive shaft 114. The controller 200 also transmits the second drive signal 214 to the second motor 108 to generate the torque 218, which includes the second component of the translation torque and the second component of the preload torque between the second transmission mechanism 126 and the drive shaft 114. Such an operation of the controller 200 minimizes the occurrence of a zero force condition on the transmission mechanisms 124, 126.

In the case where the controller 200 detects the command force signal 210 as being greater than the command force signal threshold 230, such as when an associated vehicle turns sharply around a corner, the command force signal 210 can be considered relatively large. In such a case, with reference to FIG. 4, the controller 200 refrains from applying the preload torque control signal 208 to the translation torque control signal 204 (i.e., deactivates the preload torque controller 206). Instead the controller 200 transmits the translation torque control signal 204 as the first drive signal 212 to the first motor 106 to generate a first component of the translation torque 140 between the first transmission mechanism 124 and the drive shaft 114. The controller 200 also transmits the translation torque control signal 204 as the second drive signal 214 to the second motor 108 to generate a second component of the translation torque 144 between the second transmission mechanism 126 and the drive shaft 114. In the case where the controller 200 detects the command force signal 210 as being relatively large, the translation torque control signal 204 and the associated load generated by the drive shaft 114 will be proportionally large as well, which can minimize exposure of the transmission mechanisms 124, 126 to a zero load crossing condition.

Figure 4:
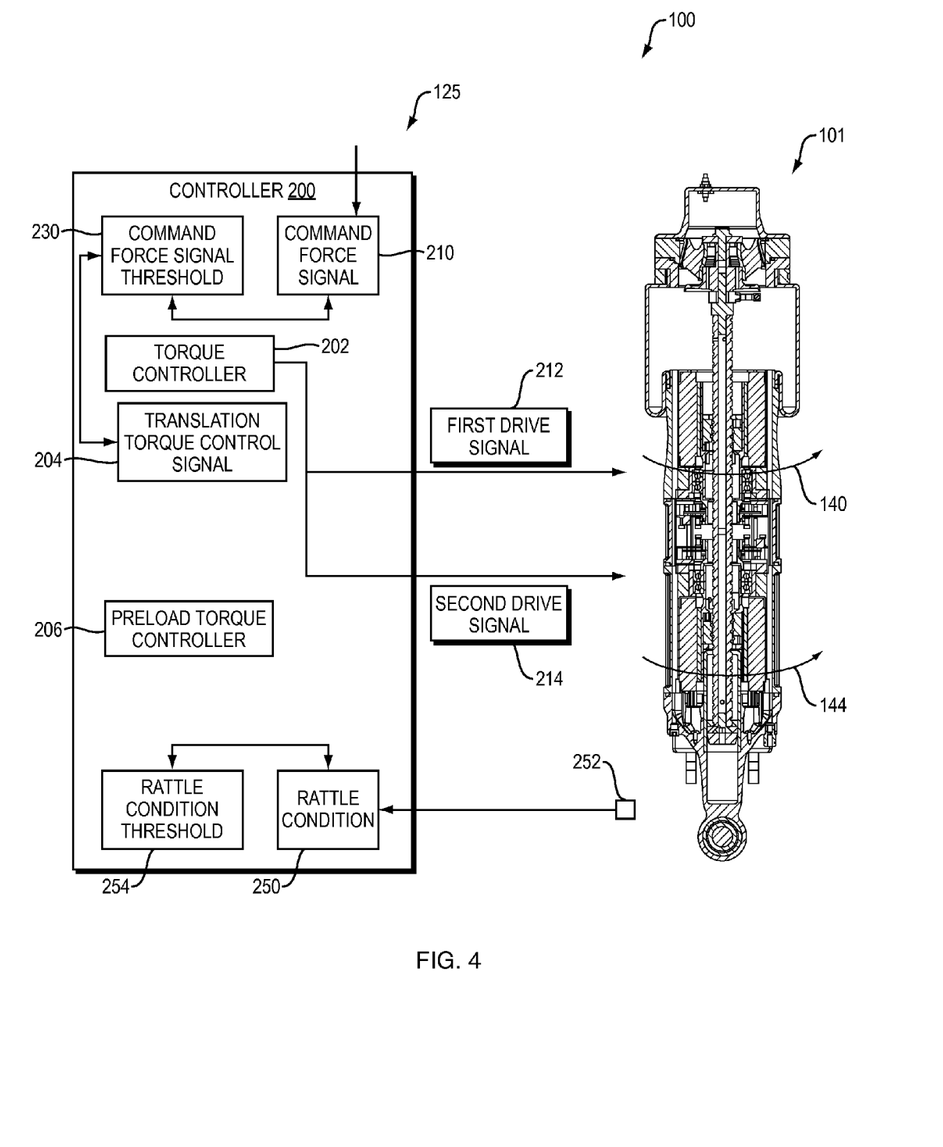
FIG. 4 illustrates a schematic representation of the controller of FIG. 2 providing a translation torque control signal as a first drive signal and a second drive signal to the actuator assembly of FIG. 1.

Such operation of the controller 200 is dynamic in nature. For example, as the relatively large command force signal 210 decreases in magnitude relative to the threshold 230 during operation, the controller 200 can reactivate the preload torque controller 206 to assist in minimizing the occurrence of zero force conditions on the transmission mechanisms 124, 126. As the command force signal 210 increases again beyond the threshold 230, the controller 200 can, again, deactivate the preload torque controller 206.

In another arrangement, with reference to FIG. 3, in the case where the controller 200 detects the command force signal 210 as being greater than the command force signal threshold 230, rather than refraining from applying the preload torque control signal 208 to the translation torque control signal 204, the controller 200 is configured to scale a magnitude of the preload torque control signal 208 prior to applying it to the translation torque control signal 204.

For example, when the controller 200 detects the command force signal 210 as being greater than the command force signal threshold 230, the controller 200 applies a magnitude scaling factor 240 to the preload torque control signal 208 to adjust a level or value associated with the preload torque control signal 208 from a first level to a second, relatively smaller level. As the controller 200 applies the adjusted preload torque control signal 208 to the translation torque control signal 204, the adjusted preload torque control signal 208 minimally affects the translation torque control signal 204. Accordingly, the translation torque control signal 204 dominates the magnitude of the first and second drive signals 212, 214. In the case where the controller 200 detects the command force signal 210 as falling below the command force signal threshold 230, the controller 200 can, in turn, refrain from applying the magnitude scaling factor 240 to the preload torque control signal 208.

In the case where the actuator assembly 100 is utilized as part of a vehicle driving on a relatively smooth road, the forces on the drive shaft 114 are substantially constant. Accordingly, the transmission mechanisms 124, 126 can substantially avoid exposure to zero load crossing conditions resulting in minimal, if any, rattle behavior associated with the actuator assembly 100. In such a case, the actuator assembly 100 can conserve power by refraining from activating the preload torque controller 206. Accordingly, the controller 200 can be configured to dynamically apply the preload torque control signal 208 to the translation torque control signal 204 in response to a detected environmental factor associated with rattle behavior in the actuator assembly 100.

For example, with reference to FIG. 3, the actuator 101 can include a rattle condition transducer 252 configured to generate a rattle condition signal or input 250. The rattle condition transducer 252 can be configured in a variety of ways. In one arrangement, the rattle condition transducer 252 is an accelerometer configured to sense wheel accelerations to predict statistically when rattle behavior happens. In one arrangement, the rattle condition transducer 252 is a microphone configured to detect audio rattle signatures associated with the actuator assembly 100.

During operation, as the controller 200 receives the rattle condition signal 250 from the rattle condition transducer 252, the controller 200 compare the rattle condition signal 250 with a rattle condition threshold 254. When the rattle condition signal 250 meets or exceeds the rattle condition threshold 254, the controller 200 detects the rattle condition signal 250 as being associated with one or both of the transmission mechanisms 124, 126 being exposed to a zero load crossing condition. As a result, the controller 200 utilizes both the torque controller 202 and the preload torque controller 206 to generate the first and second drive signals 212, 214, as described above, to minimize or eliminate the zero load crossing condition. When the rattle condition signal 250 does not meet the rattle condition threshold 254, the controller 200 detects the rattle condition signal 250 as unassociated with one or both of the transmission mechanisms 124, 126 being exposed to a zero load crossing condition. As a result, the controller 200 utilizes the torque controller 202 to generate the first and second drive signals 212, 214, as described above.

In another arrangement, with reference to FIG. 3, in the case where the controller 200 detects the rattle condition input 250 as not meeting the rattle condition threshold 254, rather than refraining from applying the preload torque control signal 208 to the translation torque control signal 204, the controller 200 is configured to scale a magnitude of the preload torque control signal 208 prior to applying it to the translation torque control signal 204, such as by using the magnitude scaling factor 240 described above.

As indicated above, the actuator 101 is configured as a counter rotating actuator such that the motor spindles 116, 118 rotate in different (i.e., opposing) directions in order to drive the drive shaft 114 in a linear direction 130. With such a configuration, the associated ball nuts 127, 129 are configured as mirror opposites to each other. Such an indication is by way of example, only. In one arrangement, the ball nuts 127, 129 of the motor assemblies 102, 104 are configured to interface with threads in the drive shaft 114 cut in the same direction, and the spindles 116, 118 of both assemblies 102, 104 rotate in the same direction to drive the drive shaft 114 in a single linear direction. In such a case, the actuator 101 is configured as a co-rotating actuator such that the motor spindles 116, 118 rotate in same direction in order to drive the drive shaft 114 in a linear direction 130. Furthermore, the preload torques 142, 146 are configured as counter rotating torques that load the set of balls between the ball nut channel and the threaded portion of the drive shaft 114.

As indicated above, the torque application system 125 can provide one or more drive signals to the drive assembly 103 which causes the corresponding motors 102, 104 and transmission mechanisms 124, 126 to apply the translation torque and the preload torque relative to the drive shaft 114. Such description is by way of example only. The torque application system 125 can be configured to direct an application of a translation torque and a preload torque between the first transmission mechanism 124 and the drive shaft 114 and between the second transmission mechanism 126 and the drive shaft 114. For example, with reference to FIG. 1, the preload torques can be applied using a variety of mechanical techniques. For example the preload torques can be applied or countered by air-spring offset forces generated by an air spring associated with the actuator 101.

While various embodiments of the invention have been particularly shown and described, it will be understood by those skilled in the art that various changes in form and details may be made therein without departing from the spirit and scope of the invention as defined by the appended claims

What is claimed is:

1. An actuator assembly that generates an axial force between a sprung mass and an unsprung mass, comprising:
   a threaded drive shaft that lies along a longitudinal axis and has first and second ends, the first end connected to one of the sprung mass and the unsprung mass;
   a housing that is connected to the other of the sprung mass and the unsprung mass, where the second end of the shaft is located within the interior of the housing such that the housing extends beyond the second end of the shaft;
   a first rotary motor that is carried within the housing;
   a first transmission mechanism comprising a first ball nut with a set of balls that are engaged with a first threaded portion of the drive shaft, the first ball nut configured to be rotated by the first motor in first and second rotational directions about the drive shaft longitudinal axis and thereby cause relative translation of the shaft and the housing in first and second translational directions along the longitudinal axis, wherein rotation of the first ball nut in the first rotational direction causes relative translation in the first translational direction, and rotation of the first ball nut in the second rotational direction causes relative translation in the second translational direction;
   a second rotary motor that is carried within the housing;
   a second transmission mechanism comprising a second ball nut that is spaced from the first ball nut and that has a set of balls that are engaged with a second threaded portion of the drive shaft, the second ball nut configured to be rotated by the second motor in the first and second rotational directions and thereby cause relative translation of the shaft and the housing in the first and second translational directions, wherein rotation of the second ball nut in the second rotational direction causes relative translation in the first translational direction, and rotation of the second ball nut in the first rotational direction causes relative translation in the second translational direction; and
   a torque application system disposed in operative communication with the first motor and the second motor, the torque application system configured to direct an application of a translation torque and a ball nut preload torque between the first transmission mechanism and the drive shaft and between the second transmission mechanism and the drive shaft;
   wherein the torque application system is configured to independently rotate the first and second motors in both rotational directions to direct the translational torques and the ball nut preload torques between the first and second transmission mechanisms and the drive shaft;
   wherein rotation of the motors in opposite directions causes relative translation of the shaft and the housing in a single translational direction;
   wherein rotation of the motors in the same direction causes ball nut preload torques with translational forces in opposite translational directions;
   wherein the torque application system comprises a controller disposed in electrical communication with the first motor and with the second motor, the controller configured to:
   (i) generate a first drive signal as a sum of a translation torque control signal and a preload torque control signal;
   (ii) generate a second drive signal as a difference between the translation torque control signal and the preload torque control signal, the second drive signal distinct from the first drive signal;

(iii) transmit the first drive signal to the first motor to generate at least one of the translation torque and the preload torque between the first transmission mechanism and the drive shaft; and (iv) transmit the second drive signal to the second motor to generate at least one of the translation torque and the preload torque between the second transmission mechanism and the drive shaft.

2. The actuator assembly of claim 1, wherein the first motor and the second motor are operable to adjust a linear position of the housing along the longitudinal axis of the drive shaft.

3. The actuator assembly of claim 1, wherein the controller is configured to:

receive a driven force signal from a sensor associated with the drive shaft, the driven force signal indicating a force generated by the drive shaft;

compare the driven force signal to a command force signal; and continue to transmit the first drive signal to the first motor and the second drive signal to the second motor until the driven force signal reaches the command force signal.

4. The actuator assembly of claim 1, wherein the controller is configured to:

compare a command force signal to a command force signal threshold;

when command force signal is less than the command force signal threshold, generate the first drive signal as the sum of the translation torque control signal and the preload torque control signal, generate the second drive signal as the difference between the translation torque control signal and the preload torque control signal, transmit the first drive signal to the first motor to generate the first component of the translation torque and the first component of the preload torque between the first transmission mechanism and the drive shaft, and transmit the second component of the translation torque and the second component of the preload torque between the second transmission mechanism and the drive shaft.

5. The actuator assembly of claim 4, wherein the controller is configured to:

when the command force signal is greater than the command force signal threshold, transmit the translation torque control signal as the first drive signal to the first motor to generate the first component of the translation torque between the first transmission mechanism and the drive shaft and transmit the translation torque control signal as the second drive signal to the second motor to generate the second component of the translation torque between the second transmission mechanism and the drive shaft.

6. The actuator assembly of claim 4, wherein the controller is configured to:

when the command force signal is greater than the command force signal threshold, scale a magnitude of the preload torque control signal from a first preload signal level to a second preload signal level, the second preload signal level being less than the first preload signal level.

7. The actuator assembly of claim 1 further comprising a rattle condition transducer that is configured to detect rattling of the balls of a ball nut and generate a rattle condition signal.

8. The actuator assembly of claim 7, wherein the controller is configured to:

compare the rattle condition signal with a rattle condition threshold; and when the rattle condition input does not meet the rattle condition threshold:

generate the first drive signal as only the translation torque control signal, with no contribution to the first drive signal from the preload torque control signal, and generate the second drive signal as only the translation torque control signal, with no contribution to the second drive signal from the preload torque control signal.

9. The actuator assembly of claim 7, wherein the controller is configured to:

compare the rattle condition signal with a rattle condition threshold, and when the rattle condition input does not meet the rattle condition threshold: scale a magnitude of the preload torque control signal from a first preload signal level to a second preload signal level, the second preload signal level being less than the First preload signal level.

10. The actuator assembly of claim 1 wherein the preload torque control signal is substantially constant.

11. The actuator assembly of claim 1 wherein the sprung mass is one of a motor vehicle body and a motor vehicle wheel assembly, and the unsprung mass is the other of the motor vehicle body and the motor vehicle wheel assembly.

12. The actuator assembly of claim 11 wherein the housing is connected to wheel assembly.

* * * * *